United States Patent [19]

Kapanen et al.

[11] 4,029,494

[45] June 14, 1977

[54] PROCESS FOR SMELTING AND RECOVERY OF A MATERIAL CONTAINING NOBLE METALS

[75] Inventors: Aarne Albin Kapanen; Raimo Uolevi Rantanen; Leo Elias Lindroos; John Henrik Relander; Risto Johannes Honkala, all of Pori, Finland

[73] Assignee: Outokumpu Oy, Helsinki, Finland

[22] Filed: Aug. 19, 1974

[21] Appl. No.: 498,321

[30] Foreign Application Priority Data

Aug. 24, 1973 Finland .............................. 2655/73

[52] U.S. Cl. .................................. 75/10 R; 75/83
[51] Int. Cl.$^2$ .......................................... C22D 7/00
[58] Field of Search ............... 75/83, 99, 10 R, 24, 75/118

[56] References Cited

UNITED STATES PATENTS

| | | | |
|---|---|---|---|
| 2,131,045 | 9/1938 | Hickman et al. | 75/83 |
| 2,478,225 | 8/1949 | Atkinson | 75/83 |
| 2,944,886 | 7/1960 | Fisher et al. | 75/83 |
| 3,676,105 | 7/1972 | McLeod et al. | 75/68 R |
| 3,902,890 | 9/1975 | Sanmiya et al. | 75/83 |

FOREIGN PATENTS OR APPLICATIONS 689,824  4/1953  United Kingdom ................... 75/83

*Primary Examiner*—M. J. Andrews
*Attorney, Agent, or Firm*—Brooks Haidt Haffner & Delahunty

[57] ABSTRACT

A process and an apparatus for the smelting of a material containing noble metals, especially anode slime produced in the electrolytic copper process, in order to recover the noble metals, whereby slag-forming materials are mixed with the material containing noble metals, whereafter the mixture is smelted in an induction furnace to produce a metal phase and a slag phase, the slag is then removed at least partly before the melt is exposed to an oxidizing treatment in the same or in another induction furnace, and finally the refined metal is recovered.

4 Claims, No Drawings

PROCESS FOR SMELTING AND RECOVERY OF A MATERIAL CONTAINING NOBLE METALS

BACKGROUND OF THE INVENTION

The present invention relates to a process and apparatus for smelting a material containing noble metals, especially an anode slime produced in connection with the electrolytic copper process, and for recovering the noble metals present therein, whereby slag-forming materials are mixed with the material containing noble metals, whereafter the mixture is smelted to produce a metal and a slag phase; the slag is then removed at least partly before the melt is exposed to an oxidizing treatment, and finally the refined metal is recovered.

So far, the Dore furnace has been used for the above purpose. It is a manually operated, and therefore relatively small, reverberatory with a flat floor and works according to the batch principle. This type of furnace has a relatively low furnace chamber, the wall of which is provided with a mouth for shoveling anode slime and slag-forming materials into the furnace chamber and for letting the melt and the slag out of the furnace. The lower part of the furnace mouth is first bricked up and then anode slime and slag-forming materials are shoveled into the furnace. Soda and borax are generally used as slag-forming chemicals.

The furnace chamber wall also has burners and air channels for heating the contents of the furnace chamber, and its ceiling has an outlet for the smoke gases. To provide an even heating, the burner flames are directed obliquely downwards towards the melt and the slag on top of it. The aim is to produce a reducing atmosphere in the furnace chamber, whereby metal is separated in small drops from the slag phase and falls onto the floor of the furnace chamber, forming a metal phase there. The temperature is kept at approx. 1200° C during the smelting and the phase separation, the aim being to bring the slag into an amorphous state.

To let the slag out of the furnace, a narrow groove is chipped or drilled in the upper part of the brickwork in the furnace mouth, the groove extending to the upper surface of the melt. The letting out of the slag is discontinued when the slag layer is thin enough, i.e., when metal drops can be seen in the following slag. Thereafter the rest of the brickwork is taken down and the rest of the slag is removed manually with scraper.

Thereafter follows the oxidizing or refining stage of the metal melt in the furnace chamber, whereby the furnace atmosphere is controlled so that it is an oxidizing one, and air or oxygen is fed through blow pipes onto the surface of the melt. The blowing is directed diagonally along the metal surface. Even at this stage, slag is removed by means of a scraper and by using cement for cementing the slag. The temperature is approx. 1100° C.

The smelting takes approx. 2 days in total and is preferably carried out to such an extent that even lead is obtained in the metal phase. It has been noted that lead drops falling towards the furnace floor effectively wash the noble metals from the slag phase.

The oxidizing stage then lasts one more day. Thereby the metals which oxidize easier are oxidized first and are transferred into the slag phase, which is then separated from the metal phase. The latter is finally cast in molds. Such easily oxidizing metals which are removed along with the slag are primarily lead and tellurium.

This previously known reverberatory has several significant disadvantages, such as:

Large amounts of gas are produced in the furnace chamber and carry away along with them a great deal of valuable dust, which constitutes a great circulating load when it is returned from a wet-wash venturi positioned after the furnace. Most of this load accumulates in the oxidizing stage, thereby increasing the impurities in the noble metal.

The number of burners is limited and therefore their effect must be extended over as large an area as possible. The flames must be directed onto the surface of the batch, whereby a considerable difference in temperature is created between the surface and the bottom of the batch. Because the metal phase accumulating at the floor of the furnace chamber must, however, be kept molten, the surface of the relatively thick slag phase must be heated more than would otherwise be necessary, which naturally increases fuel costs and causes wear on the lining bricks of the furnace chamber. Therefore the furnace chamber is very flat to reduce the thickness of the batch itself. Thus, the contact surface between the metal melt and the furnace chamber floor is very large, whereby more than a normal amount of noble metal is caught in the pores and seams of the lining material and increases noble metal losses.

The size of the furnace is relatively large in proportion to the final amount of pure metal, which constitutes only approx. 10% of the original volume. On the other hand, the size of the furnace is limited by its manual operation, for drawing out the slag and mixing the slag-forming materials with the melt take place manually, a factor which naturally limits the dimensions of the furnace. Thus, very great amounts of refined noble metal cannot be obtained from the furnace in one batch.

The total treatment period of one batch is very long, approx. 3 days.

The work is heavy three-shift work, and the periodical operation rapidly wears out the linings.

The object of the present invention is to eliminate the above disadvantages and to provide a process and apparatus for the smelting of noble metals and for the recovery of noble metals, especially from the anode slime produced in connection with the electrolytic copper process.

SUMMARY OF THE INVENTION

According to the invention there is now provided a new and useful process and apparatus for smelting and recovering materials containing noble metals by heating the material with slag-forming materials in an induction furnace to produce a metal phase and slag phase and then oxidizing the metal phase after at least partial withdrawal of the slag phase to produce refined metal which finally is recovered.

The oxidizing treatment may advantageously be carried out in another induction furnace conducted in series with the first mentioned furnace.

DESCRIPTION OF THE PREFERRED EMBODIMENTS

According to the invention, the heat requisite for the smelting and refining of a material containing noble metals is thus generated inductively by using an induction furnace which operates at a frequency above approx. 50 Hz and below approx. 10 MHz. Also, two induction furnaces coupled in series in relation to the melt can be used, whereby the refining is carried out in one of the furnaces, preferably by feeding air or oxygen below the melt surface. Therefore a higher frequency, 1–10 MHz, can be used in the smelting and a lower frequency, 900–1200 Hz, in the refining.

When two furnaces are used, the first furnace has preferably been provided with a silicon carbide crucible and the second one with a, for example, ceramic crucible. Anode slime can be heated directly with a high-frequency induction current, but preferably such a crucible is used as can be heated with the network-frequency induction current, such as a silicon carbide crucible, from which the heat is then transferred into the anode slime. A silicon carbide crucible has, in addition, a reducing effect, and therefore it is very suitable for the smelting of anode slime. When a metal phase begins to form in the silicon carbide crucible, the metal phase is heated inductively as well. When a ceramic crucible is used, there may be metal at the bottom of the crucible, and the metal is heated inductively and smelts with heat the fed slime.

The produced slag is removed by tipping the furnace. Thereby only the upper surface of the slag, poor in silver, is removed. Thereafter anode slime can be added in an amount corresponding to the removed slag.

After smelting, the metal phase is transferred into the second furnace by tipping the smelting furnace. The crucible of the second furnace can be smaller than that of the first, since the volume of the metal phase is only approx. one-tenth of the original volume of the treated anode slime, or the same volume, in which case several smelting batches are collected in this second furnace before refining.

This second furnace has preferably a ceramic crucible which is not heated by the infuction field. The metal in the crucible, on the other hand, is heated effectively even in a low-frequency induction field.

The oxidizing can be carried out by blowing air or oxygen onto the surface of the melt or under it, whereby slag which binds impurities may be on the surface and thus a selective separation of impurities, such as lead and tellurium, and their recovery from the slag can be achieved.

Thus, by the process and with the apparatus according to the invention, the following advantages are gained in comparison with the previously known apparatuses:

The only gases produced in the smelting furnace originate in the slag. The amount of these gases is very small compared with the gas amounts produced when a fuel is burned with air or oxygen. The flying dust amounts thereby also remain considerably lesser.

The anode slime can be heated and smelted evenly. The metal drops are heated inductively, also, whereby an even viscosity and an even heat transfer are obtained. The crucible can be shaped appropriately so that the contact surface between the metal phase and the crucible is relatively small and that the crucible takes little space. Much higher temperatures and a greater selection of slag-forming materials, especially materials which do not corrode the crucible material, can be used. At the oxidizing stage, oxygen or air can be blown under the melt surface, and thereby a slag layer which removes impurities, and a selective removal of impurities by means of the slag, can be used. The relative efficiency of oxygen will also be greater, which naturally reduces the costs and causes smaller gas flows.

The furnace size is much smaller than before and the furnace can be tippable, which facilitates the separation of slag and also makes it more exact. No cement needs to be added to cement the slag. On the other hand, the furnaces can be made much larger by volume than previously, since the difficult manual work is mostly eliminated and the operation of the furnaces can be easily automated.

The treatment period is considerably shorter, approx. 1 to 1.5 days.

The work is easy and can be automated to a great extent. it is no longer necessary to brick up the mouth of the furnace and then take down the brickwork, or to draw the slag out with a scraper, as before. The operation can be made continuous by using two furnaces, whereby the capacity can be easily regulated.

Induction furnaces have been used even before for the smelting of metals, but not for the smelting and refining of a material containing noble metals, such as the anode slime from the electrolytic copper process. It has obviously been thought that heating with oil burners is the least expensive method, and the advantages gained by induction smelting have not been taken into consideration. When materials containing noble metals are treated, it is primarily important to minimize the loss of valuable materials. Next to this question, the consumption of energy is a secondary factor.

The invention is described below by way of examples.

EXAMPLE 1

The amounts of materials given below have been calculated for 1000 kg of anode slime. 1000 kg of selenium-free anode slime, which contained silver 20.7%, gold 0.51%, lead 21.8%, tellurium 2.8%, and copper 2.6%, was fed into an induction furnace provided with a silicon carbide crucible, together with 250 kg of soda and borax. The frequency used for induction heating was in the previously indicated range, between about 50 Hz and about 10 MHz. The temperature was kept at 1200° C for approx. 12 hours, whereafter approx. 630 kg of slag phase was recovered, which contained silver 0.27%, and 308.3 kg of metal phase, which contained silver 66.7% (yield 99.2%), gold 1.65%, lead 16.9%, copper 4.5%, and tellurium 4.8%.

The metal phase was poured into the second furnace, which had been provided with a ceramic crucible and air pipes for feeding air or oxygen under the melt surface at a rate of approx. 30 $Nm^3/h$. Approx. 100 kg of soda and borax were also added to form slag during the oxidizing stage, during which the temperature was kept at 1100° C. for approx. 12 hours.

Approx. 70 kg of slag and 204 kg of refined noble metal, which contained silver 95.4%, (yield 95%), gold 2.5%, lead 0.05%, copper 1.5%, and tellurium 0.1%, were obtained. The metal was cast into anodes.

EXAMPLE 2

In practice the operation was the same as in Example 1, but a silicon carbide crucible with a volume of 300 liters was used for the smelting. 1400 kg of anode slime and 420 kg of soda and borax were fed into the crucible. Approx. 90% of the slag was removed, whereby 400 kg of unrefined metal was obtained, and when still 1400 kg of anode slime was added to this, a total of 800 kg of metal and slag was finally obtained. Thereafter all the slag was poured out from the surface of the melt, and the metal was transferred to the second, 80-liter induction furnace provided with a crucible.

After a total treatment period of 32 hours, 560 kg of refined noble metal was obtained.

The anode slime from the electrolytic copper process was fed into the furnace in the form of particles of the approximate size of a pea. The flying dusts were recovered by means of a wet wash venturi and returned to the furnace.

What is claimed is:

1. A process for smelting of anode slime containing at least one of the noble metals gold and silver produced in the electrolytic copper process in order to recover the noble metals, comprising mixing slag-forming materials with the anode slime; smelting the mixture in a first inductively heated zone to produce a metal phase and a slag phase; at least partly withdrawing the slag phase from the first inductively heated zone and transferring the metal phase from the first inductively heated zone to a second inductively heated zone operating at a lower frequency than the first inductively heated zone and oxidizing the metal phase in said second treatment zone to form a refined product containing said noble metals.

2. The process of claim 1 wherein oxygen or oxygenous gas is fed in under the surface of the melt in said second inductively heated zone.

3. The process of claim 1 wherein the slag-forming materials comprise soda and borax.

4. The process of claim 1 wherein the inductive heating in said first inductively heated zone is carried out within a frequency range of 1–10 MHz and the inductive heating in said second inductively heated zone is carried out within a frequency range of 900–1200 Hz.

* * * * *